Oct. 2, 1956     D. O. HENDRIX ET AL     2,764,908
AUTO COLLIMATING COMPARATOR
Filed May 12, 1952
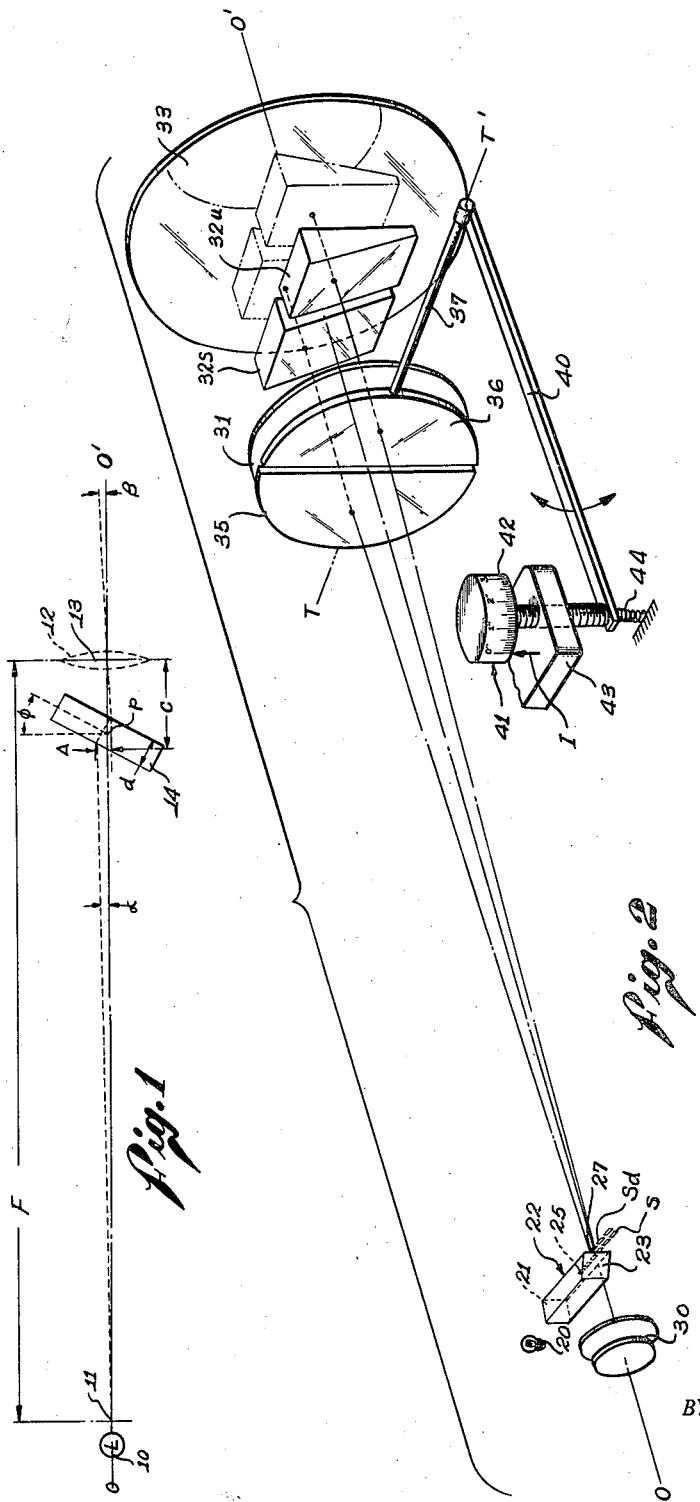
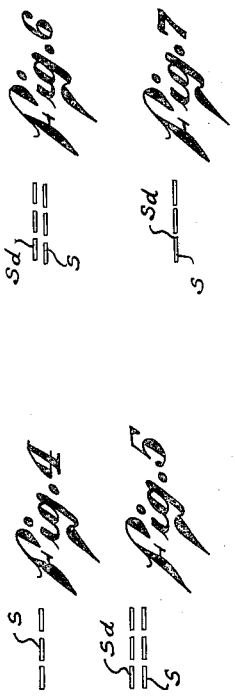
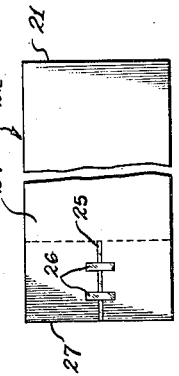
INVENTORS
DON O. HENDRIX
DONALD E. DAVIDSON
BY
Attorney United States Patent Office  2,764,908
Patented Oct. 2, 1956

2,764,908
AUTO COLLIMATING COMPARATOR

Don O. Hendrix, Pasadena, and Donald E. Davidson, La Habra, Calif., assignors to Davidson Manufacturing Company, Los Angeles, Calif., a firm Application May 12, 1952, Serial No. 287,382

2 Claims. (Cl. 88—1)

This invention relates generally to the field of auto collimators, and its general object is the provision of a novel auto collimator equipped with means for making precision measurements or comparisons of small angular differences in optical paths through optical devices, as for example, small differences in angle through two nearly identical prisms, to an accuracy of the order of a few tenths of a second of arc. Typical application of the invention is to the comparison of an unknown prism to a standard to determine minute differences of angle.

Stated briefly, the invention provides a collimator equipped with a pair of parallel-sided glass plates, located side by side as close as possible to the nodal plane of the collimator lens and in the convergent beam of this lens. The light path from the light source through the collimator is thus divided into two halves passing through these two plates. One of these plates is arranged for tipping movement on a transverse axis, and the other may be stationary. The tipping plate, when moved through a given angle, deviates the light through the corresponding half of the system, but through a very much smaller angle. In a typical use of the invention, two prisms to be compared, one a standard, and the other a prism to be checked or measured, are placed side by side outside the collimator lens, i. e., beyond the collimator lens from the light source. The unknown prism may then introduce a deviation in light path which differs from that introduced by the standard prism. Rotation of the tipping plate is capable of compensating this difference in deviation, and the amount of rotation of the tipping plate found necessary to compensate the difference becomes a measure of that difference. The system includes means for making this compensation with extreme accuracy, preferably taking advantage of the well known "vernier acuity" of the eye, which is good to 8 to 15 seconds of arc, as compared to the usual 1 to 2 minutes resolving power. With a magnification of 40 times, such as is preferably employed, this acuity is improved to .2 of a second of arc. The well known "blink" method may also be used as will appear. This system is not to be confused with existing uses of tipping plates near the focus, or in the parallel beam immediately in front of the objective.

In the drawings, showing a present preferred embodiment of the invention:

Figure 1 is an optical diagram illustrating the ray deviating effect of a tipping plate used near the lens in a collimator;

Figure 2 is a diagrammatic perspective of a present preferred embodiment of the invention;

Figure 3 is a side elevational view of a prism having a light slit; and

Figures 4–7 show slit images as viewed through the eye-piece.

With reference first to Figure 1, which is illustrative of a basic principle utilized by the invention, numeral 10 designates a light source comprising a lamp L behind a pin hole 11, and 12 is a collimator lens, stopped down by means of a diaphragm 13 to a small opening, the pin hole 11 being spaced from lens 12 by the focal length F of the latter. Immediately adjacent lens 12, and between the light source and said lens, is a parallel sided glass plate or flat 14, of thickness $d$, arranged for pivotal movement on an axis $p$ located on optic axis O—O'. If now the plate 14 be tipped to an angle $\phi$, the ray path (dashed line) from the source through the plate 14 and lens aperture will be deviated from the axis O—O' as indicated, where the angles $\alpha$ and $\beta$ are equal. It will be evident that tipping of plate 14 through angle $\phi$ results in deviating the ray through the much smaller angle $\alpha$ (or $\beta$). Also, tipping of plate 14 through angle $\phi$ is equivalent in effect on the ray emerging from the lens to rotating the lens and source about the transverse axis of the lens through the much smaller angle $\beta$. It can readily be shown that $$\sin \beta = \frac{\sin \phi \left(\frac{n-1}{n}\right) d}{F}$$

where $n$ is the index of refraction of the plate 14. From this equation it can immediately be seen that a given angular deflection of plate 14 produces a very much smaller angular deviation of the ray. The tipping plate thus placed furnishes a tool by which exceedingly small angular deviations of light rays through a collimator can be produced, and measurement of such angles of deviation can readily be made to extraordinary precision by measurement of the travel of a geared up manually operable device by which the tipping plate is deflected. Such a ray deviation system is employed in the invention, which will now be described at large.

A lamp 20 is positioned opposite the squared rearward end 21 of a rectangular prism 22 having a 45° bevelled forward end 23. This prism is silvered or otherwise coated to be opaque over its entire exterior surface excepting for its end 21, which is left clear for entrance of light rays from lamp 20. The surface of bevelled end 23 forms an internal reflector, acting to reflect the rays transmitted to it from lamp 20 toward the adjacent or opposed end portion of the side surface 24 of the prism. A suitable light aperture, preferably in the form of narrow slit 25, parallel to the length of the prism, is cut through the opaque surface coating of the prism on this opposed end portion of surface 24, as seen best in Figure 3. This slit may properly be about 1/8" in length and .001" in width. In the preferred practice of the invention, the slit 25 is interrupted by short opaque intermediate segments, about .020" in length for a 40 power eye-piece, and conveniently formed by means of strips 26 of opaque metal foil cemented to the surface of the prism directly across the slit. The slit then consists, in effect, of spaced, linearly alined transparent slit segments.

The prism 22 is positioned with its forward edge 27 adjacent the optic axis O—O' of the collimator, just forward of eye-piece 30, with its slit facing collimator lens 31. The distance from the slit to the lens 31 is equal to the focal length of the lens, and the illuminated slit becomes the light source of the collimator.

Optical elements to be compared, for example, wedge prisms 32s and 32u, are placed side by side, on opposite side of axis O—O', in the path of the light from the light source through lens 31. Beyond said optical elementt is a flat mirror 33.

Immediately in back of lens 31 (assuming the surface of lens 31 facing the prisms 32s and 32u and the mirror 33 to be the "front" side of said lens) are a pair of parallel sided optically flat glass tiping plates 35 and 36, disposed normally in the same plane transverse of axis O—O', and located on opposite sides of said axis. These tipping plates, which are thus placed in the convergent beam of the lens, and as close thereto as possible, are conveniently in the form of parallel-sided half-disks, with their diametral edges close spaced and opposed to one another, as shown. Also, the tipping plates are so oriented that their diametral edges are at right angles to the direction of the slit. In a present embodiment, they are ¼" in thickness. The two tiping plates are mounted and arranged for relative rotation or tipping action on a tipping axis T—T' intersecting optic axis O—O', and extending parallel to slit 25. Both of the plates may be arranged for tipping action, but let it first be assumed that plate 35 is stationarily mounted and only the plate 36 is arranged for tipping. To accomplish this function, the plate 36 is mounted on a rotatable shaft 37 extending along axis T—T', and furnished with any suitable bearings, not illustrated.

A geared-up manually operable device is provided for rotating the tipping plate, and in the present illustrative embodiment, comprises a long arm 40, and a manually operable screw 41 having a calibrated head 42. This screw is threaded in a suitable stationary mounting member 43, and the tip of its threaded shank engages the extremity of arm 40, so that rotation of the screw 41 moves arm 40, thereby rotating shaft 37 and correspondingly tipping the plate 36. Any suitable expedient may be resorted to for maintaining engagement between the shank of the screw and the extremity of arm 40; as here diagrammatically indicated, a spring 44 acts against the arm to hold it against the screw. It will be noted that, with this geared-up arrangement, a considerable rotation of the screw is required to produce a small angular deflection of tipping plate 36. Recalling that a given deflection of the tipping plate produces a very much smaller deviation of the light path through the collimator, it is seen that the screw 41 furnishes a means by which a sensible manual adjustment accomplishes an exceedingly minute deviation of the light path through the deflected tipping plate. With proper design, it is easily possible to accomplish adjustment of the light path to an accuracy of the order of a second of arc. Accordingly, the head of the screw is calibrated in seconds and tenths of seconds of arc, and a suitable indicator I is provided. In practice, the dispersion of a number of readings taken from the indicator I does not vary over .2 second on either side of the median reading.

Let it first be assumed that the two plates 35 and 36 are precisely parallel, and located precisely at right angles to axis O—O', that prisms 32s and 32u are omitted, and that mirror 33 is precisely at right angles to axis O—O'. Then, with slit 25 spaced from lens 31 by a distance equal to the focal length of the latter, and positioned just to one side of axis O—O', light rays from the slit will traverse the system to mirror 33, and will then retraverse the system in the reverse direction to form a slit image S directly in line with slit 25, but on the opposite side of axis O—O', where it can be viewed directly by eye-piece 30, all in accordance with well known optical principles. The slit image S as viewed through the eye-piece would then appear as shown in Figure 4. If now the tipping plate 36 is slightly deflected about axis T—T', half the light rays, i. e., those passing through the plate 36, will be deviated by a small angle in passing through the system, this following from the transverse offsetting of the rays in passing through the then angularly disposed tipping plate. Passing from the light source through the plate 36, the rays are transversely offset, but remain parallel to their original direction. These transversely offset rays will not be brought to precise parallelism with the optic axis of the collimator lens upon passing therethrough, but will emerge at a very slight angle to said axis. They will evidently return from the reflector at the opposite angle to the optic axis, and after passing through the lens and plate, will be brought to a focus at some vertical spacing from the original position. Thus, two vertically spaced slit images S and Sd may be seen through the eye-piece, for instance as shown in Figure 5.

It may now be seen that, with the system in this condition, rotation of tipping plate 36 will either further separate the slit images, or will bring them toward coincidence or alinement. The system may be used in this condition, but to further aid in judging when the slit images have been brought precisely into alinement, it is found in practice that it is advantageous to have the two slit images slightly offset from one another in a longitudinal direction. To accomplish this, one of the tipping plates is rotated through a slight angle about an axis at right angles to the direction of the slit (about a vertical axis in Figure 2). While either of the tipping plates may be selected for this adjustment, it will be assumed that the plate 35 is so rotated. This means that the plate 35, instead of being precisely parallel to the plate 36 when the latter is in its normal position (Figure 2), has been slightly rotated about an axis parallel to its diametral edge, or in other words, at right angles to the tipping axis. With this further adjustment, and assuming the tipping plate 36 to be again deflected through a small angle about its tipping axis T—T', the two slit images will then appear as in Figure 6. Preferably, the amount of offset is made such that ends of the segments of one slit image fall midway in the gaps between segments of the other slit image, as shown in Figure 6. With this provision, it is very easy to judge when the two slit images have been brought into precise alinement by rotation of the tipping plate. The accuracy with which the eye can judge the alinement of the slit images under such circumstances is quite remarkable, and is referred to as "vernier acuity" of the eye. Figure 7 shows the appearance of the slit images when so alined.

Assume now that the system is to be used to compare two optical elements, for example, a known or standard element, and an unknown element. The elements to be so compared may be of many types, including, for example, but without limitation, wedge prisms, parallel sided optical flats, Porro prisms, penta prisms, and the like. For a simple illustration, we have here chosen to illustrate the invention with use of two wedge prisms, a standard prism 32s, and a similar but unknown prism 32u.

The flat mirror 33 requires orientation, taking into account the deviation in light path introduced by the prisms or other optical elements to be measured or compared. For example, a wedge prism such as that indicated at 32s will deviate the light rays passing from lens 31 to mirror 33 through a small angle, and the mirror 33 is then adjusted through a corresponding angle from its originally assumed position (normal to axis O—O'). Thus, rays emergent from lens 31 and traveling to mirror 33 will be returned to the lens, after reflection at 33, the same as though the standard prism 32s were not present. Rays emergent from lens 31 and passing through unknown prism 32u to the mirror, and then returning through prism 32u to the lens, will, however, be deviated through any angle by which the prism 32u differs from the standard prism 32s.

It may now be seen that the manually operable tipping plate 36 furnishes a means for compensating any such deviation introduced by a departure in angle of prism 32u as compared with standard prism 32s. For example, let it be assumed that, with tipping plate 36 in its zero deflection position (indicated by coincidence of the "zero" on screw head 42 with indicate I), a standard prism 32s in back of plate 35, and an unknown prism 32u in back of plate 36, the two slit images formed by the system are definitely spaced apart, as viewed through the eye-piece (see Figure 6). Screw head 42 is then rotated, tipping the plate 36, and such tipping deviates the light rays through it. If the deviation is made in the right directions, this deviation tends toward compensation of any deviation which has been introduced by reason of differences in prism 32u as compared with standard prism 32s. Sufficient rotation of screw head 42 brings the two slit images into alinement, indicating complete compensation of the deviation caused by difference between the unknown and standard prisms. The type of coincidence alinement here provided permits this compensation to be effected with extreme precision, as for example, with no greater error than a few tenths of a second of arc. Compensation having been accomplished, the amount of light path deviation introduced by the tipping plate to produce the compensation is then indicated by the amount the tipping plate was deflected from its initial "zero" deflection position. Proper calibration of screw head 42 permits this deviation to be read directly.

In a present embodiment, using a lens 31 of 21" focal length, and a tipping plate ¼" in thickness, arm 40 is approximately 8" in length, and the pitch of screw 41 is 8 threads to the inch. This results in a deviation of the light path through plate 36 amounting to 10" of arc per revolution of the screw. The screw head 42 can accordingly be calibrated directly in seconds and tenths of seconds of arc.

It is important to note the very high "step-down" ratio from lead screw head 42 to the light beam deviated by the tipping plate. In the present embodiment, with dimensions as given, one complete turn of the lead screw (360°) produces 10" deviation of the light beam, and this is a step-down ratio of 12,960 to 1. The lead screw, with 8 threads to the inch, and a lever arm 40 of about 8" in length, produces about 1° of rotation of tipping plate shaft 36 for 360° of rotation of the screw; and 1° of rotation of the tipping plate then produces 10" of deviation of the light beam. Therefore, the mechanical step-down ratio from the lead screw to the tipping plate is about 360 to 1, and the optical step-down ratio from the tipping plate to the light beam is also about 360 to 1, giving an overall step-down ratio or "advantage" of 12,960 to 1. A lead screw can easily be made to an accuracy of one or two thousandths of an inch. Considering that 10" of arc deviation of the light path corresponds to ⅛" measured along the lead screw, it is seen that an error of a few thousandths along the lead screw vanishes to all practical intents and purposes insofar as any effect on the light path is concerned. The optical tipping plate, with its great optical step-down ratio, is thus a prime feature of the invention, and a further feature is the combination with this tipping plate of a mechanical operating device comprised of a lead screw and lever, which also has a relatively great mechanical advantage, and at the same time can easily be made to an accuracy which will avoid introduction of mechanical error of any significance whatsoever.

The plate 35 has been described as stationarily mounted with respect to axis T—T'. Actually, it is preferred that it be arranged for adjustment tipping about this axis, and for being held stationarily in adjusted position, any suitable physical provisions being made for such purpose. With such arrangement, plate 35 may be rotated to compensate known errors in standard prism 32s, or to establish zero position on the screw 41, or other operator.

The invention has been discussed in the foregoing chiefly in the aspect of measurement of angular differences between a standard and an unknown prism. In this aspect, assuming identical glass, deviations in the angle of a prism can be measured with error no greater than a few tenths of seconds of arc. However, any differences in optical paths capable of causing a light path deviation can be compared and measured, whether owing to differences in angle between entrance and emergence faces of a prism, differences in angle of internal reflection faces, or differences in index of refraction. Thus, the device may be used as a comparator to determine differences of refractive index of geometrically identical glass prisms. In this case, two prisms are made, one of a known, and one of an unknown glass. The angles of refraction are then compared in the device of the invention to obtain the refractive index of the known sample. The only revision of the device necessary is to substitute a suitable mono-chromatic light source for the lamp 20. This system has the obvious advantage of eliminating the arcuate circular scale usually used in conventional instruments for refractive index measurements.

The device also has other potential fields of use, and is to be regarded generally as a collimator having means for precision deviation of light rays through one-half of the system, including means for precise measurement of any deviation so introduced, available for any application where such an optical tool is found to have use.

The system of the invention has been described in one present preferred form, but can obviously take other forms. The light slit, for example, is capable of considerable modification. Also, while it is preferred that the slit images be viewed simultaneously while being brought into coincidence, they may be viewed alternately, suitable blinking devices being provided for rapidly closing off first one-half of the system and then the other, "persistence of vision" permitting the observer to judge when the two images are in alinement. The tipping plates are described as being preferably parallel sided optical flats, but parallel faces are not essential, and, in fact, a slight departure from parallelism may be resorted to in the case of one of the tipping plates to throw the slit images into the preferred longitudinally offset positions. The system will inevitably be subject to considerable modifications beyond the collimator lens, particularly in the position of the reflector 33, in order to accommodate to different optical devices to be compared or measured. Further, in some applications, the mirror 33 may be eliminated entirely, and the deviated and undeviated light beams utilized or compared by suitable optical devices without return through the collimator.

We claim:

1. In an auto collimator, the combination of: a collimator lens, an illuminated aperture along the optic axis of said lens and in the focal plane thereof, a pair of flat sided optical plates mounted side by side in back of said lens, between said lens and said illuminated aperture, and closely adjacent to said lens, so as to be in the convergent beam of said lens, said plates occupying positions behind opposite halves of said lens, one of said plates being mounted substantially at right angles to the optic axis of said lens, means for tipping the other of said plates on a tipping axis transverse to said optic axis of said lens, means for indicating the angle of tip of said last mentioned plate, and an eye-piece arranged to focus on images of said illuminated aperture formed by said collimator lens in its focal plane through said flat sided optical plates.

2. The subject matter of claim 1, wherein said illuminated aperture comprises at least two alined longitudinally spaced slit segments optically parallel to said tipping axis, and wherein one of said plates is slightly tilted relatively to the other on an axis at right angles to said tipping axis, so that an end of at least one slit segment of a slit image formed in said focal plane by light traversing one of said plates is spaced slightly in a longitudinal direction from an opposed end of a slit segment of a slit image formed in said focal plane by light traversing the other of said plates.

References Cited in the file of this patent

UNITED STATES PATENTS

| | | |
|---|---|---|
| 1,590,532 | Lenouvel | June 29, 1926 |
| 1,906,803 | Mueller | May 2, 1933 |
| 2,064,145 | Bonneau | Dec. 15, 1936 |
| 2,168,637 | Whitwell | Aug. 8, 1939 |
| 2,346,496 | Lorance | Apr. 11, 1944 |
| 2,424,976 | Golay et al. | Aug. 5, 1947 |
| 2,461,166 | Luboshez | Feb. 8, 1949 |
| 2,577,807 | Pryor | Dec. 11, 1951 |

FOREIGN PATENTS

| | | |
|---|---|---|
| 187,609 | Great Britain | Oct. 18, 1922 |
| 393,737 | Germany | Apr. 15, 1924 |